US011873925B2

(12) United States Patent
Thorogood et al.

(10) Patent No.: US 11,873,925 B2
(45) Date of Patent: Jan. 16, 2024

(54) GIMBAL JOINT AND METHOD

(71) Applicant: Eaton Intelligent Power Limited, Dublin (IE)

(72) Inventors: Graeme Thorogood, Ellicott City, MD (US); William Denning, Pine Grove, PA (US); Nathaniel Johnson, Denver, NC (US); Juan J. Lara, Irving, TX (US); Julien H. Cohen, Royal Oak, MI (US); Ricky Sasmal, West Chester, OH (US)

(73) Assignee: Eaton Intelligent Power Limited, Dublin (IE)

( * ) Notice: Subject to any disclaimer, the term of this patent is extended or adjusted under 35 U.S.C. 154(b) by 865 days.

(21) Appl. No.: 16/131,638

(22) Filed: Sep. 14, 2018

(65) Prior Publication Data

US 2019/0086009 A1    Mar. 21, 2019

Related U.S. Application Data

(60) Provisional application No. 62/696,539, filed on Jul. 11, 2018, provisional application No. 62/560,255, filed on Sep. 19, 2017.

(51) Int. Cl.
*F16L 27/02* (2006.01)
*F16L 27/04* (2006.01)

(52) U.S. Cl.
CPC ............... *F16L 27/02* (2013.01); *F16L 27/04* (2013.01)

(58) Field of Classification Search
CPC . F16L 27/02; F16L 27/04; F16L 27/10; F16L 27/11; F16L 51/03; F16L 51/04

USPC ........................................................ 285/272
See application file for complete search history.

(56) References Cited

U.S. PATENT DOCUMENTS

| | | | | |
|---|---|---|---|---|
| 1,690,839 A | * | 11/1928 | Roth ....................... | F16L 27/04 285/110 |
| 1,884,944 A | | 10/1932 | Williams | |
| 2,451,438 A | * | 10/1948 | Hartman ................. | F16L 27/02 285/236 |
| 3,915,482 A | * | 10/1975 | Fletcher .............. | F16L 27/0857 285/226 |

(Continued)

FOREIGN PATENT DOCUMENTS

| | | |
|---|---|---|
| DE | 56622 C | 5/1891 |
| EP | 1338839 | 8/2003 |

(Continued)

OTHER PUBLICATIONS

European Search Report GB1815284.3, dated Mar. 6, 2019.

(Continued)

*Primary Examiner* — Zachary T Dragicevich
*Assistant Examiner* — Fannie C Kee
(74) *Attorney, Agent, or Firm* — Merchant and Gould, PC

(57) ABSTRACT

A gimbal joint includes a monolithic first member including a first connection portion; and a monolithic second member including a second connection portion engaged with the first connection portion such that the monolithic first member and the monolithic second member are configured to move relative to each other about a plurality of axes. The first member may include a plurality of structural portions and a support base. The support base may include an axially-extending aperture that extends through the support base.

13 Claims, 15 Drawing Sheets

(56) References Cited

U.S. PATENT DOCUMENTS

| | | | | |
|---|---|---|---|---|
| 4,480,857 | A | * | 11/1984 | Graves ............... F16L 27/0857 285/226 |
| 4,645,244 | A | | 2/1987 | Curtis |
| 4,856,827 | A | * | 8/1989 | Delamare ........... F16F 15/0232 285/268 |
| 5,184,891 | A | * | 2/1993 | Shpigel ................. F16C 11/06 362/283 |
| 5,791,697 | A | * | 8/1998 | Godel ................. F01N 13/1811 285/114 |
| 6,846,022 | B2 | | 1/2005 | Takagi |
| 2008/0174105 | A1 | * | 7/2008 | Hyatt ..................... F16L 27/11 285/7 |
| 2010/0156096 | A1 | * | 6/2010 | Challender ............ F16L 27/06 285/261 |
| 2013/0300106 | A1 | * | 11/2013 | French .................... F16L 27/00 285/237 |
| 2014/0265310 | A1 | * | 9/2014 | Halkyard ................. F03G 7/05 285/226 |

FOREIGN PATENT DOCUMENTS

| | | | | |
|---|---|---|---|---|
| EP | 2487323 | A1 * | 8/2012 | ............ F16L 27/047 |
| GB | 287594 | A | 3/1928 | |
| GB | 484838 | A | 5/1938 | |
| GB | 792476 | A * | 3/1958 | .......... F16L 27/0857 |
| GB | 846905 | A | 8/1960 | |
| GB | 1359934 | A | 7/1974 | |
| JP | H02199321 | A | 8/1990 | |
| WO | 9207212 | A1 | 4/1992 | |
| WO | WO-9207211 | A1 * | 4/1992 | .......... F16L 27/0857 |

OTHER PUBLICATIONS

French Search Report FR 1858490, dated Mar. 20, 2020.
European Search Report for application EP03090043, dated May 8, 2002, 2 pages.
Intellectual Property Office Search Report for GB1815284.3, dated Mar. 16, 2002.

* cited by examiner

GIMBAL JOINT AND METHOD

CROSS-REFERENCE TO RELATED APPLICATION

This application claims the benefit of U.S. Provisional Patent Application Ser. No. 62/560,255, filed on Sep. 19, 2017, and U.S. Provisional Patent Application Ser. No. 62/696,539, filed on Jul. 11, 2018 the disclosures of which are hereby incorporated herein by reference in their entireties.

TECHNICAL FIELD

The present disclosure generally relates to connecting members, such as gimbal joints that may be used, for example, in connection with aircraft fluid ducts.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some joint designs may include many components and may be relatively complicated to assemble.

There is a desire for solutions/options that minimize or eliminate one or more challenges or shortcomings of joints. The foregoing discussion is intended only to illustrate examples of the present field and should not be taken as a disavowal of scope.

SUMMARY

In embodiments, a gimbal joint may include a monolithic first member including a first connection portion, and/or a monolithic second member including a second connection portion engaged with the first connection portion such that the monolithic first member and the monolithic second member are configured to move relative to each other about a plurality of axes. The first member may include a plurality of structural portions and a support base. The support base may include an axially-extending aperture that extends through the support base.

The foregoing and other aspects, features, details, utilities, and/or advantages of embodiments of the present disclosure will be apparent from reading the following description, and from reviewing the accompanying drawings.

DETAILED DESCRIPTION

Figure 1:
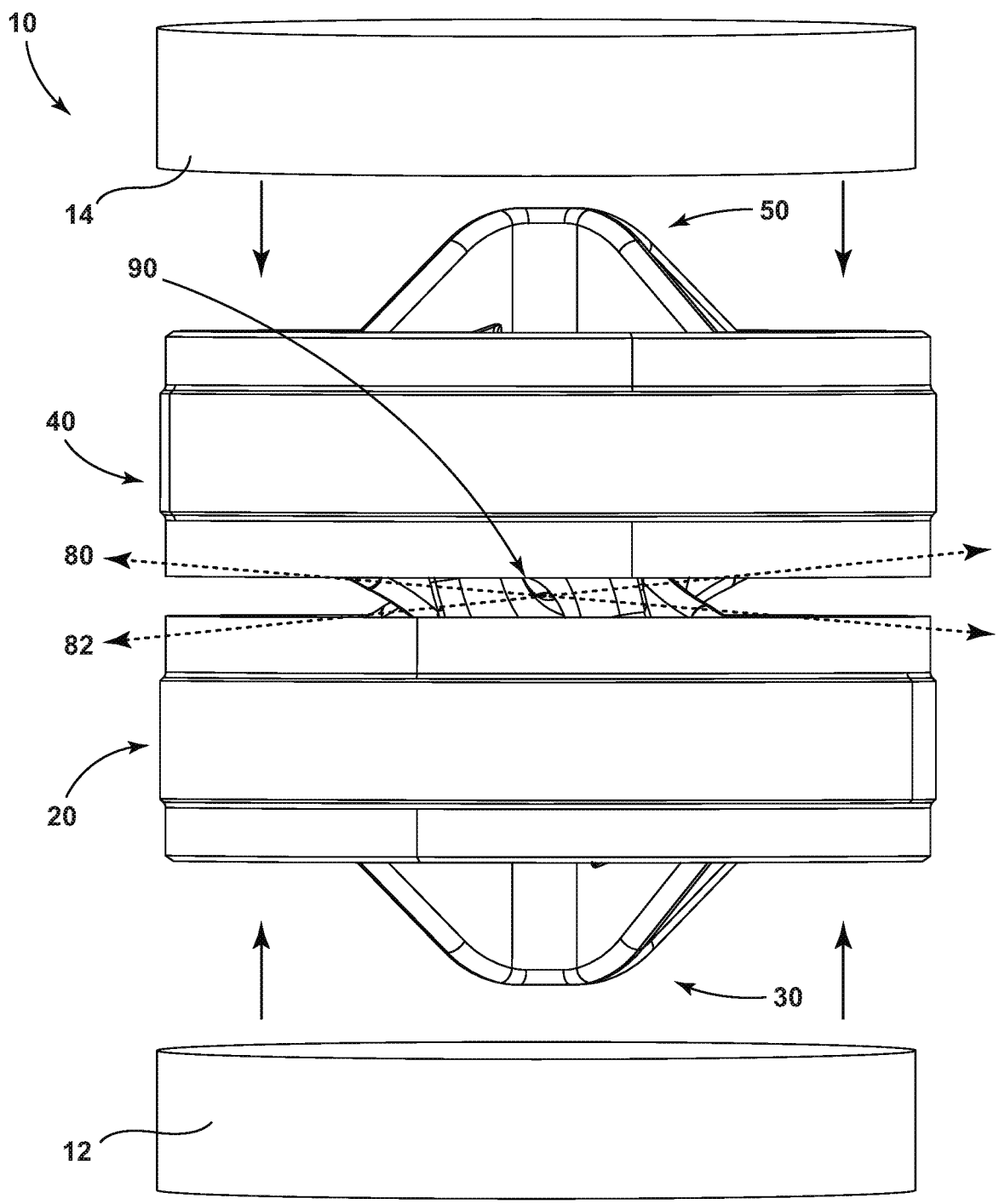
FIG. 1 is a side view generally illustrating an embodiment of a gimbal joint according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1, 2, 2A, 2B, 3, 4, and 5, a gimbal joint 10 may include a first member 20 and a second member 40 that may be connected together. First member 20 may be connected with a first fluid conduit 12, such as, for example, a high temperature aircraft fluid duct. Second member 40 may be connected with a second fluid conduit 14, such as, for example, a high temperature aircraft fluid duct. Connecting first member 20 and second member 40 may provide fluid communication between first fluid conduit 12 and second fluid conduit 14. First member 20 and second member 40 may be connected such that the members may move relative to each other, which may facilitate relative movement between first fluid conduit 12 and second fluid conduit 14. A gimbal joint 10 may include a central axis 10A. A gimbal joint 10 may include one or more of a variety of materials, such as, for example only, metals, plastics, polymers, and alloys, among others.

Figure 2:
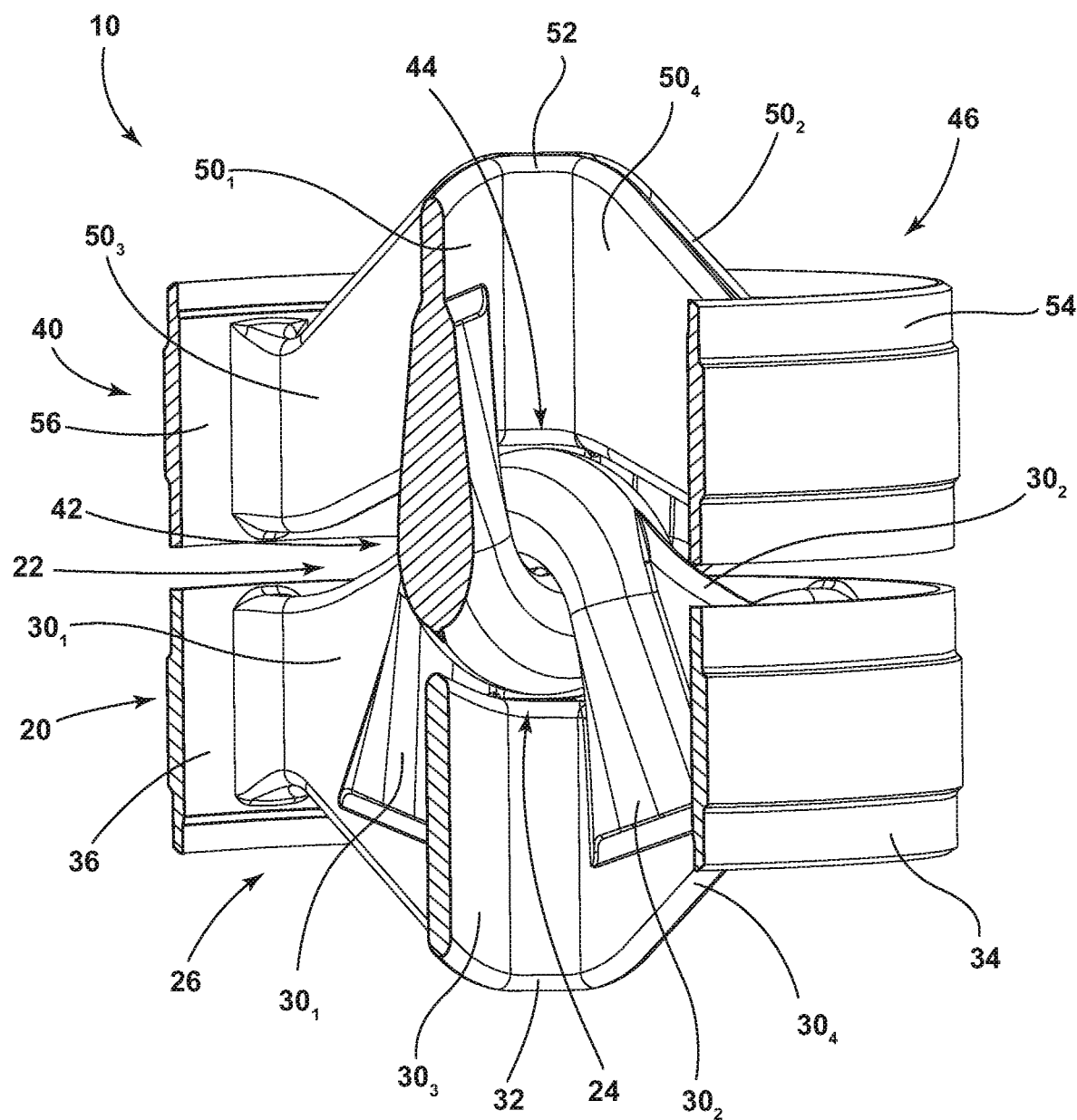
FIGS. 2 and 2A are cross-sectional views generally illustrating embodiments of gimbal joints according to teachings of the present disclosure.

With embodiments, and with reference to FIG. 2, a first member 20 may include a first connection portion 22 and/or a second member 40 may include a second connection portion 42. First connection portion 22 and second connection portion 42 may be connected/engaged (e.g., intertwined or inter-looped) with each other, such as to connect first member 20 and second member 40. First connection portion 22 and second connection portion 42 may include one or more of a variety of shapes, sizes, configurations, and/or materials.

In embodiments, such as generally illustrated in FIGS. 2-5, a first connection portion 22 and/or second connection portion 42 may include a loop configuration. For example and without limitation, first connection portion 22 may provide or define an aperture 24 that may be configured to at least partially receive second connection portion 42. A second connection portion 42 may provide or define an aperture 44 that may be configured to at least partially receive first connection portion 22.

With embodiments, a first member 20 may include one or more structural portions 30 and/or a support base 32. Additionally or alternatively, second member 40 may include one or more structural portions 50 and/or a support base 52. For example and without limitation, first member 20 may include four structural portions $30_1$, $30_2$, $30_3$, $30_4$ and second member 40 may include four structural portions $50_1$, $50_2$, $50_3$, $50_4$. Support base 32 may be disposed at or about a center of first member 20 (e.g., aligned or substantially aligned with axis 10A). Support base 52 may be disposed at or about a center of second member 40 (e.g., aligned with axis 10A). Structural portions 30, 50 may extend radially from a support base 32, 52 to inner surfaces 36, 56 of outer walls 34, 54 of first member 20 and second member 40, respectively. Structural portions 30, 50 may be generally planar and may, for example, be disposed in parallel to planes defined by axial and radial directions. For example and without limitation, structural portions 30, 50 may be equally spaced (e.g., circumferentially) and/or may be disposed in a generally X-shaped or a generally plus ("+")-shaped configuration. In embodiments, structural portions 30 of first member 20 may be angled away from second member 40 and/or may extend axially beyond outer wall 34 and/or to a first/rear end 26 of first member 20. Structural portions 50 of second member 40 may be angled away from first member 20 and/or may extend axially beyond outer wall 54 and/or to a first/rear end 46 of second member 40.

Figure 2A:
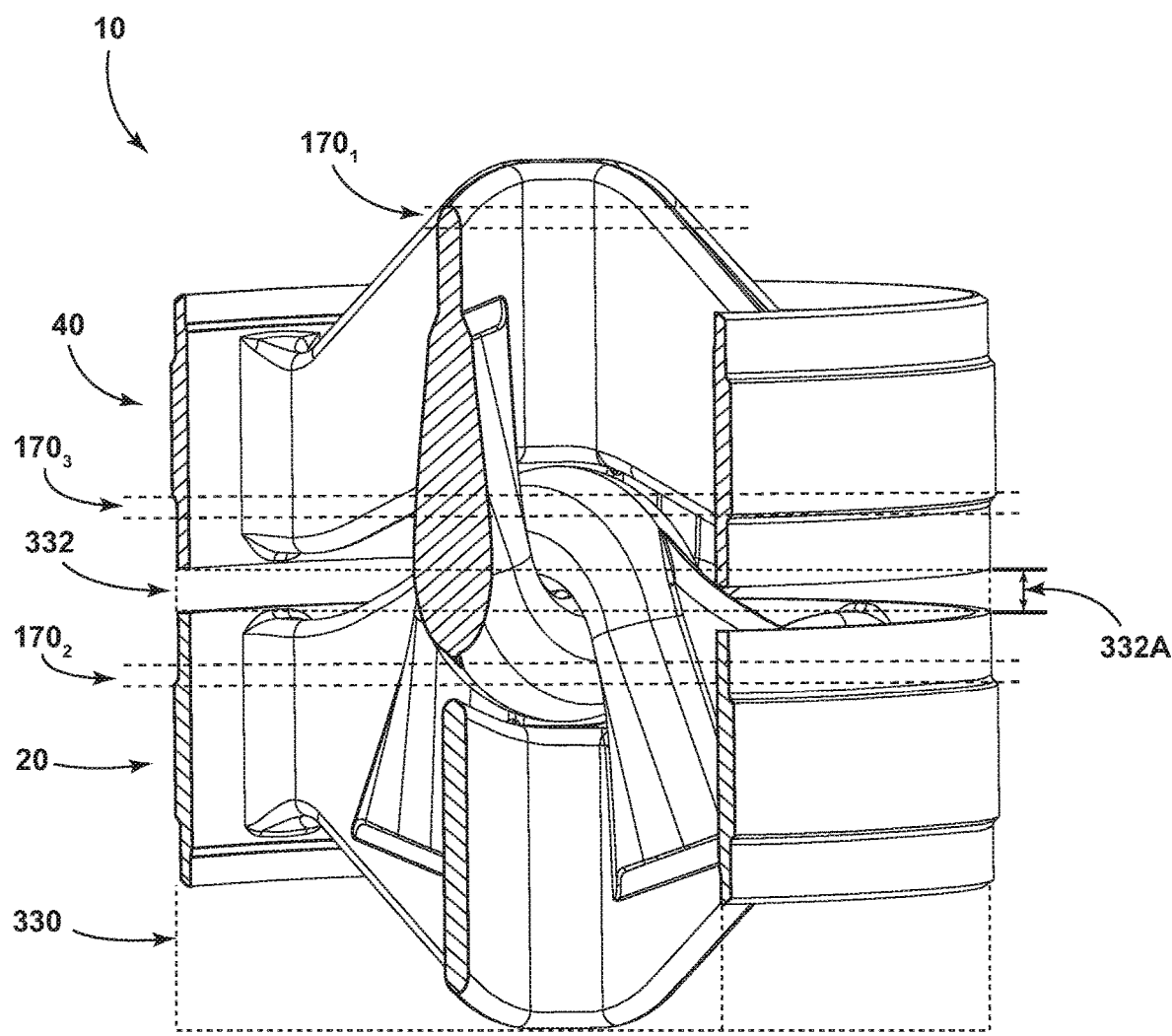
Figure 2B:
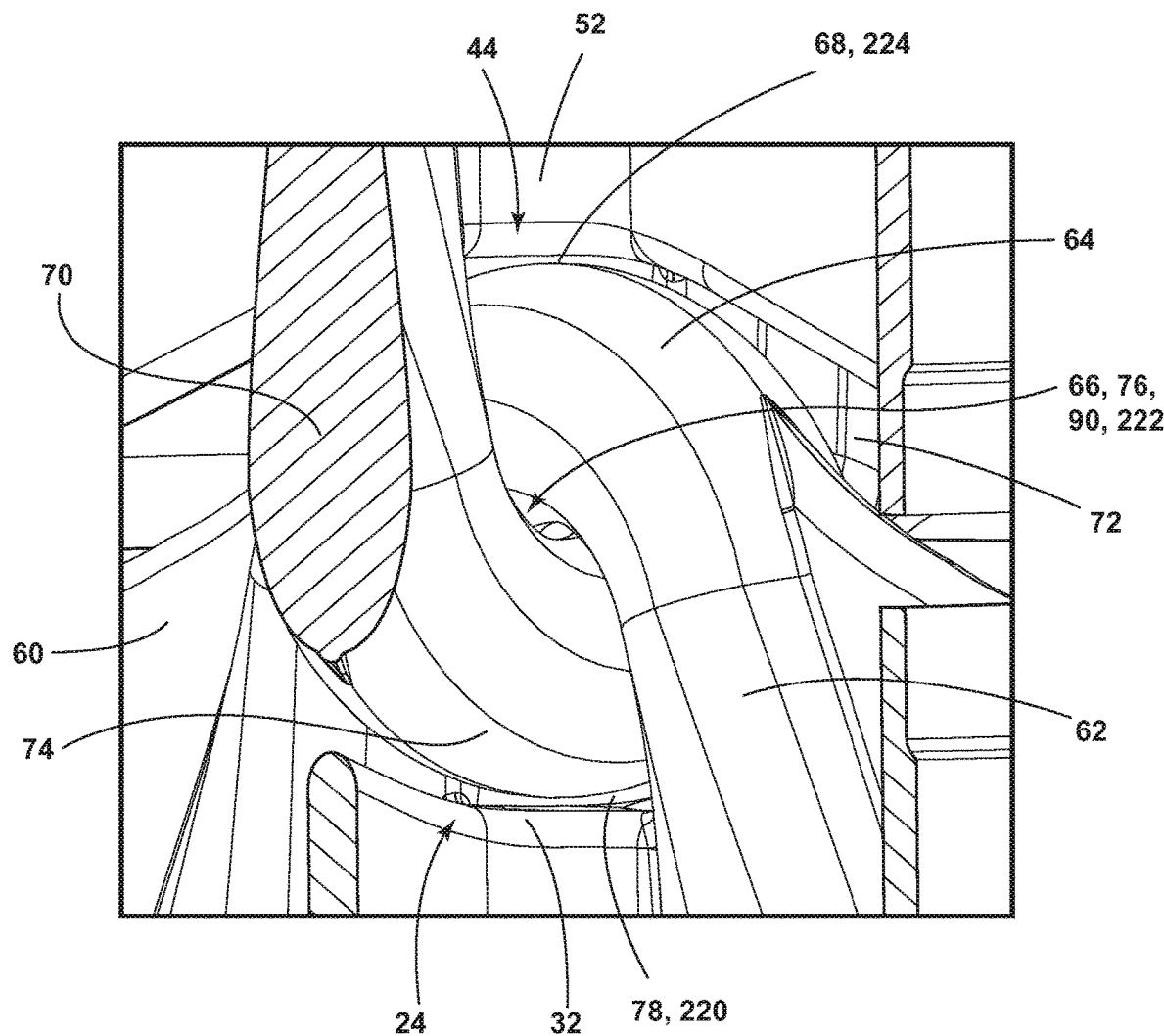
FIG. 2B is an enlarged cross-sectional view generally illustrating an embodiment of a gimbal joint according to teachings of the present disclosure.
Figure 3:
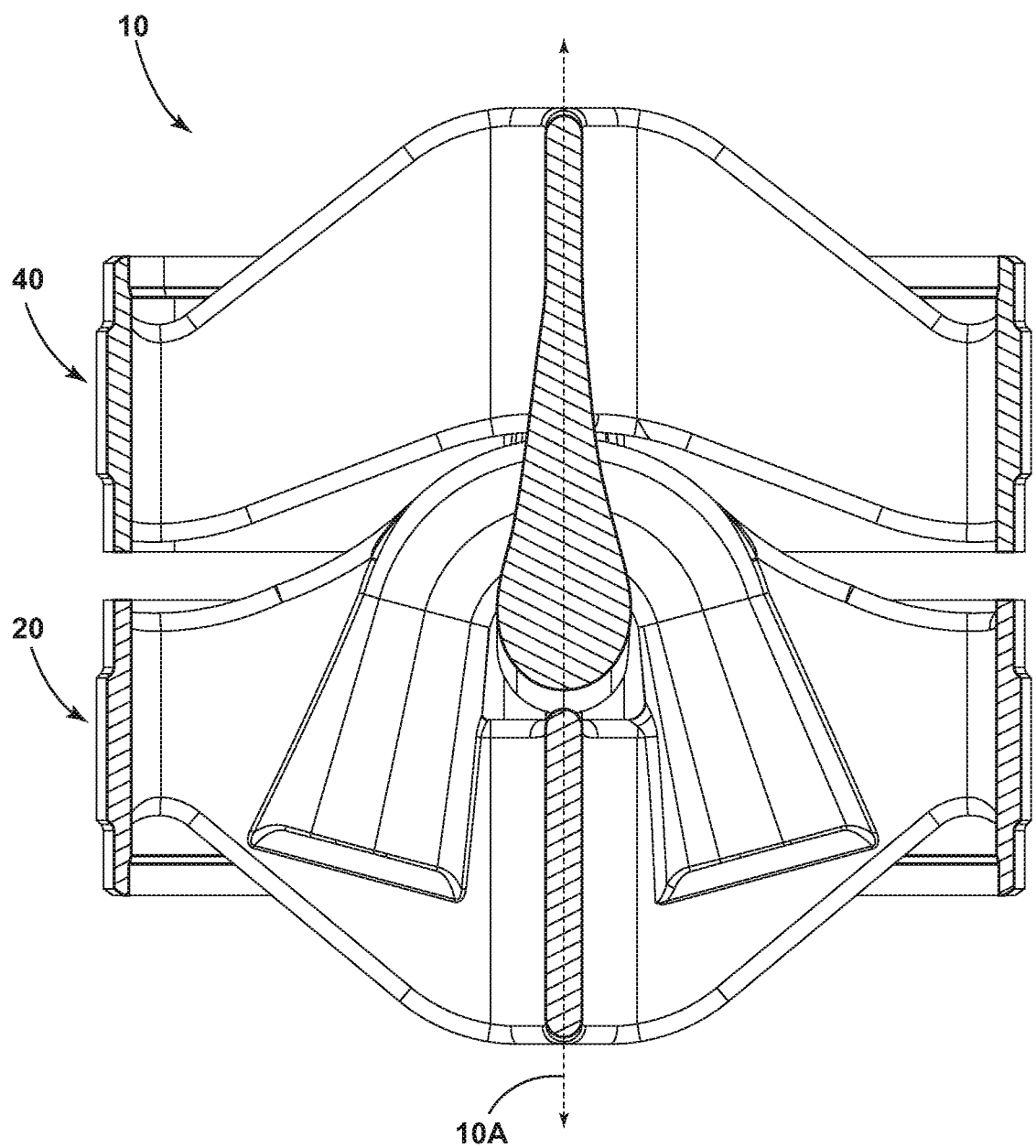
FIG. 3 is a cross-sectional view generally illustrating an embodiment of a gimbal joint according to teachings of the present disclosure.

In embodiments, a first connection portion 22 may extend from and/or be integrally formed with a first structural portion $30_1$ and/or a second structural portion $30_2$ of first member 20. For example and without limitation, and as generally illustrated in FIG. 2B, first connection portion 22 may include a first leg 60 connected to and/or formed with first structural portion $30_1$. Additionally or alternatively, first connection portion 22 may include a second leg 62 connected to and/or formed with second structural portion $30_2$. A thickness of first structural portion $30_1$ at or about a connection area with first leg 60 may be greater than a thickness of first structural portion $30_1$ in other portions or areas thereof. A thickness of second structural portion $30_2$ at or about a connection area with second leg 62 may be greater than a thickness of second structural portion $30_2$ in other portions or areas thereof. First structural portion $30_1$ and second structural portion $30_2$ may be disposed substantially in parallel with each other and/or may be substantially coplanar.

A first leg 60 of a first connection portion 22 may extend from first structural portion $30_1$ in a substantially axial direction (e.g., toward second member 40) and a second leg 62 of first connection portion 22 may extend from second structural portion $30_2$ in a substantially axial direction (e.g., toward second member 40). First connection portion 22 may include a curved section 64 that may connect first leg 60 and second leg 62. For example and without limitation, first leg 60, second leg 62, and curved section 64 may be disposed in and/or provide a generally U-shaped and/or loop-shaped configuration. First leg 60, second leg 62, curved section 64, first structural portion $30_1$, second structural portion $30_2$, and/or support base 32 may provide or define an aperture 24 that may be configured to at least partially receive second connection portion 42 (e.g., may be disposed at least partially around second connection portion 42). With embodiments, a cross-sectional shape of first leg 60 and/or second leg 62 may be substantially rectangular. A cross-sectional shape of curved section 64 may, for example, be substantially circular.

In embodiments, a second connection portion 42 may extend from a first structural portion $50_1$ and/or from a second structural portion $50_2$ of second member 40. For example and without limitation, second connection portion 42 may include a first leg 70 that may be connected to and/or formed with first structural portion $50_1$ and second connection portion 42 may include a second leg 72 connected to and/or formed with second structural portion $50_2$. First structural portion $50_1$ and second structural portion $50_2$ may be disposed substantially in parallel with each other and/or may be substantially coplanar.

A first leg 70 of second connection portion 42 may extend from first structural portion $50_1$ in a substantially axial direction (e.g., toward first member 20) and a second leg 72 of second connection portion 42 may extend from second structural portion $50_2$ in a substantially axial direction (e.g., toward first member 20). Second connection portion 42 may include a curved section 74 that may connect first leg 70 and second leg 72. For example and without limitation, first leg 70, second leg 72, and curved section 74 may be disposed in and/or provide a generally U-shaped and/or loop-shaped configuration. First leg 70, second leg 72, curved section 74, first structural portion $50_1$, second structural portion $50_2$, and/or support base 52 may provide or define an aperture 44 that may be configured to at least partially receive first connection portion 22 (e.g., may be disposed at least partially around first connection portion 22).

In embodiments, at least some of curved section 64 of first connection portion 22 may be disposed in aperture 44 of second member 40 and/or at least some of curved section 74 of second connection portion 42 may be disposed in aperture 24 of first member 20. First member 20 may, for example, rotate relative to second member 40 about a first axis 80 that may extend through a contact area or point 90 of curved section 64 of first connection portion 22 and curved section 74 of second connection portion 42 (e.g., between inner surfaces 66, 76 of curved section 64 and curved section 74). Second member 40 may, for example, rotate relative to first member 20 about a second axis 82 that may extend through contact area or point 90. First axis 80 and second axis 82 may be substantially perpendicular to each other and/or may intersect at or about a center of gimbal joint 10 and/or contact area or point 90. In embodiments, first axis 80 and second axis 82 may not be disposed perpendicularly to each other, such as to provide greater relative movement in a particular direction or directions. First axis 80 and/or second axis 82 may be disposed substantially in parallel with radial directions.

With embodiments, a first member 20 and a second member 40 may be substantially identical. In a connected or assembled configuration, for example, first member 20 and second member 40 may be disposed at an angle of about 90 degrees relative to each other, which may include first connection portion 22 and second connection portion 42 being disposed at an angle of about 90 degrees relative to each other.

Figure 6:
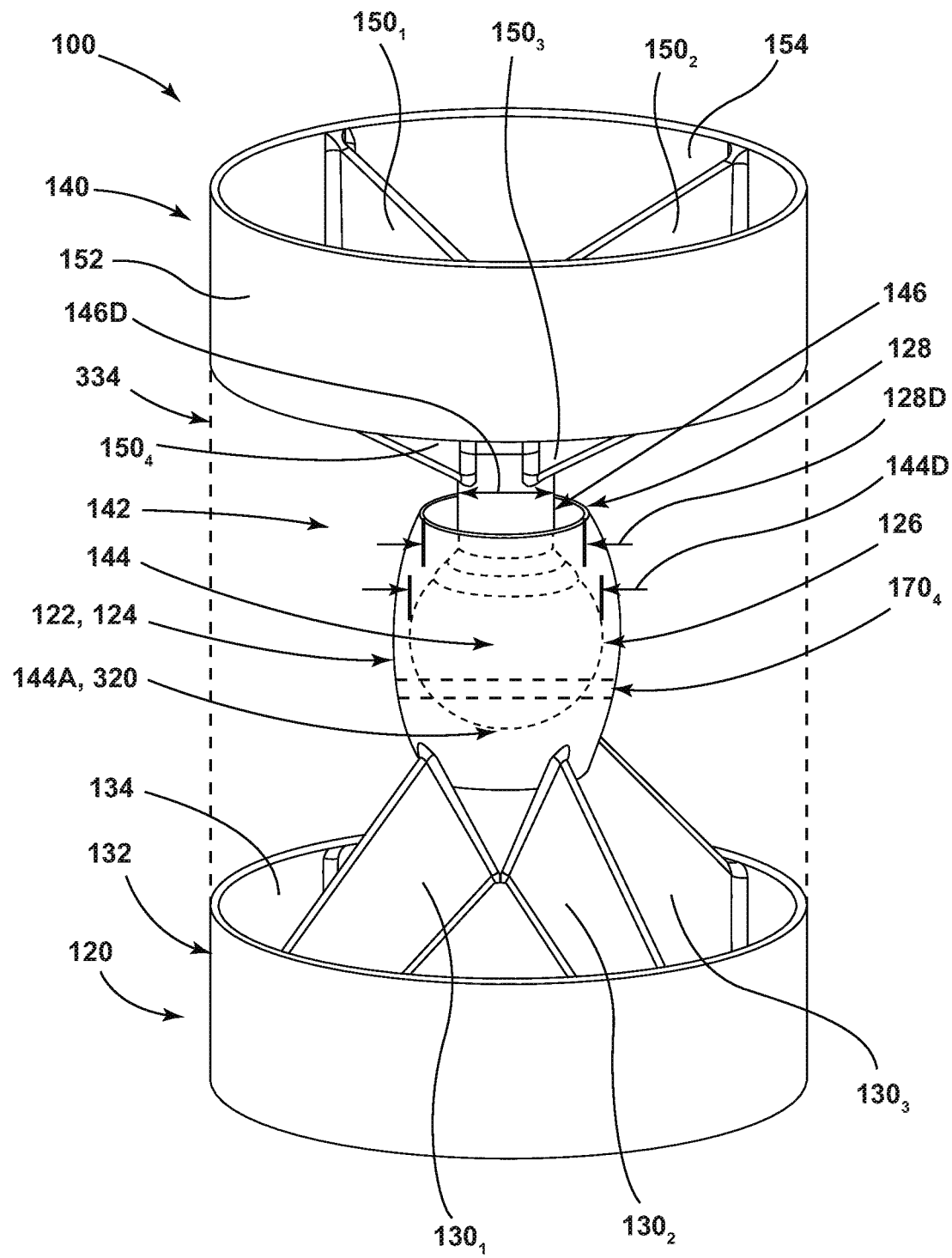
FIG. 6 is a perspective view generally illustrating an embodiment of a gimbal joint according to teachings of the present disclosure and in which portions are shown as at least partially transparent.
Figure 7:
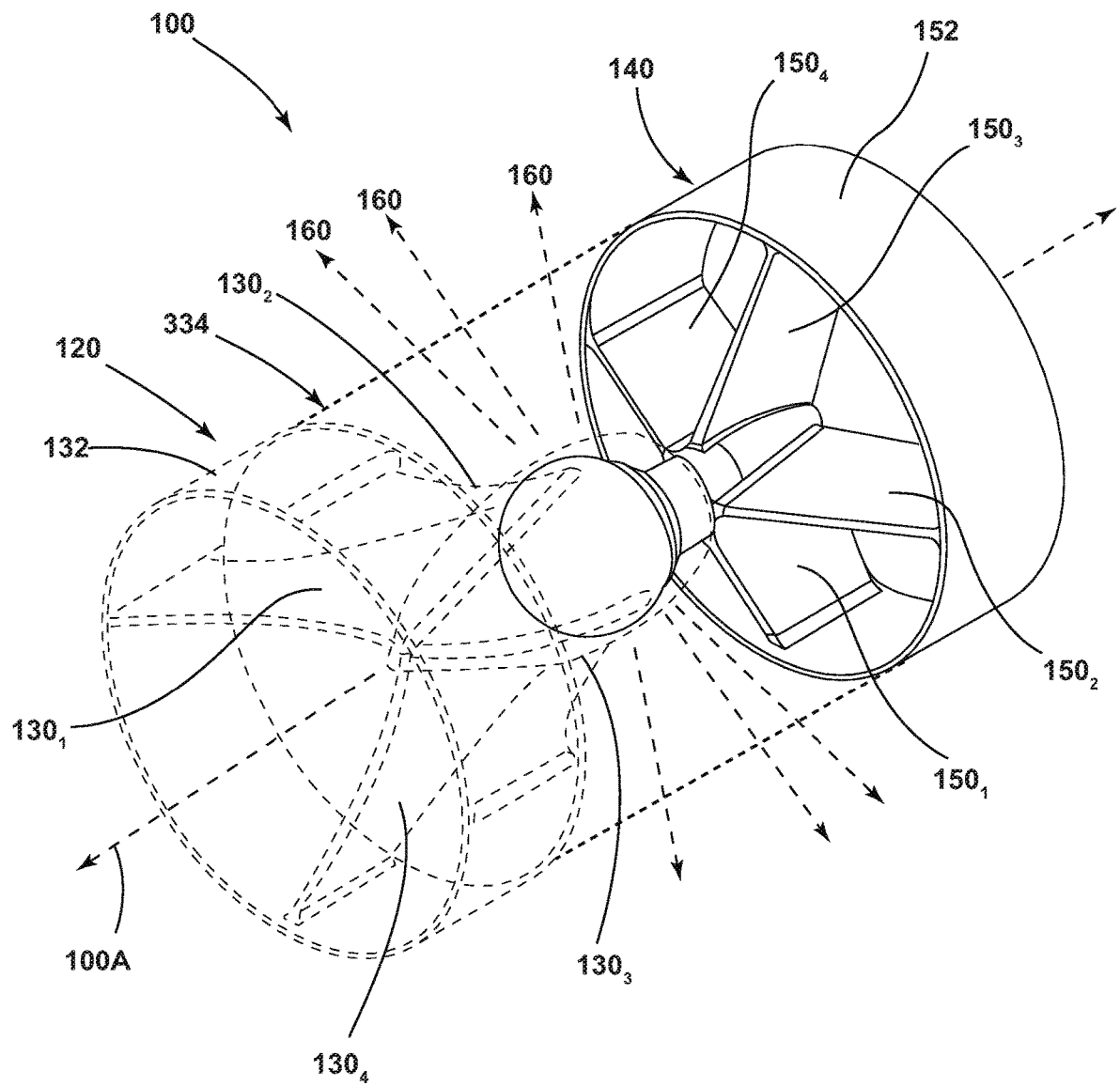
FIG. 7 is a perspective view generally illustrating an embodiment of a gimbal joint according to teachings of the present disclosure and in which portions are shown as at least partially transparent.

In embodiments, such as generally illustrated in FIGS. 6 and 7, a gimbal joint 100 may include a first member 120 that has a socket configuration and/or gimbal joint 100 may include a second member 140 that has a ball configuration. A gimbal joint 100 may include a central axis 100A. First member 120 may include an outer wall 132 and/or one or more structural portions 130 that may be connected to an inner surface 134 of outer wall 132. Structural portions 130 may be connected to outer wall 132 and/or to a first connection portion 122 of first member 120.

First member 120 may, for example only and without limitation, include four structural portions 1301, 1302, 1303, 1304 that may be circumferentially spaced (e.g., equally) about outer wall 132 and/or about first connection portion 122. First connection portion 122 may include a socket 124 configured to at least partially receive a ball 144 of second member 140. Ball 144 of second member 140 may, for example, include a substantially spherical configuration that may correspond to an inner shape of socket 124. Outer wall 132 of first member 120 may be substantially cylindrical. Structural portions 130 may extend from outer wall 132 to first connection portion 122 in an axial direction (e.g., generally toward second member 140) and/or radial directions (e.g., radially inward toward first connection portion 122). For example and without limitation, structural portions 130 may be disposed at oblique angles relative to an axial direction and/or relative to radial directions, and may be disposed substantially perpendicular to a circumferential direction.

In embodiments, a first connection portion 122 and/or a socket 124 may include a generally conical and/or ovoid shape that may include a receiving chamber 126 and/or an aperture 128. Receiving chamber 126 may at least partially receive ball 144 of second connection portion 142. Aperture 128 may at least partially receive a connecting portion 146 of second connection portion 142 that may connect ball 144 with structural portions 150 of second member 140.

With embodiments, a second member 140 may include an outer wall 152 and/or one or more structural portions 150 that may be connected to an inner surface 154 of outer wall 152. Outer wall 152 may, for example, be substantially cylindrical. Structural portions 150 may connect outer wall 152 to a second connection portion 142. Second member 140 may, for example only, include four structural portions 1501, 1502, 1503, 1504 that may be circumferentially spaced (e.g., equally) about outer wall 152. Second connection portion 142 may include a connecting portion 146 and/or a ball 144 that may at be disposed at least partially in socket 124 of first member 120. An outer diameter 144D of a ball 144 may be larger than an inner diameter 128D of aperture 128 of socket 124. For example and without limitation, inner diameter 128D of aperture 128 may be too small for ball 144 to be removed from chamber 126 and/or too small for ball 144 to be inserted into chamber 126 through aperture 128. Socket 124 may not be configured to flex or deform to permit insertion or removal of ball 144 into or from receiving chamber 126.

A connecting portion 146 (e.g., a shaft or tube) may connect ball 144 with structural portions 150 and may extend substantially in an axial direction. In embodiments, an outer diameter 144D of ball 144 may be greater than an inner diameter 128D of aperture 128, which may be greater than an outer diameter 146D of connecting portion 146. Structural portions 150 may extend from outer wall 152 to second connection portion 142 in an axial direction (e.g., generally toward first member 120) and/or radial directions (e.g., radially inward toward second connection portion 142). For example and without limitation, structural portions 150 may be disposed at oblique angles relative to an axial direction and/or relative to radial directions, and may be disposed substantially perpendicular to a circumferential direction.

In embodiments, a ball 144 of second member 140 may be connected with and/or disposed in socket 124 such that first member 120 and second member 140 may move (e.g., rotate) relative to each other. For example and without limitation, first member 120 and/or second member 140 may rotate about axis 100A and/or may rotate about a plurality of axes 160 that may, for example, extend through ball 144 (e.g., at or about center of ball 144). In embodiments, socket 124 and ball 144 may restrict and/or substantially prevent relative movement between first member 120 and second member 140 in at least one direction (e.g., an axial direction).

With embodiments, first member 120 and second member 140 may be connected with fluid conduits (e.g., fluid conduits 12, 14, as generally illustrated in FIG. 1) such that fluid may flow from first fluid conduit 12, through first member 120 (e.g., around first connection portion 122), through second member 140, and into second fluid conduit 14.

In embodiments, a gimbal joint 10, 100 may not include a gimbal ring or fasteners (e.g., bolts) that may be used with other joints, and which may make such other joints difficult and/or more complicated to assemble/form.

Figure 8:
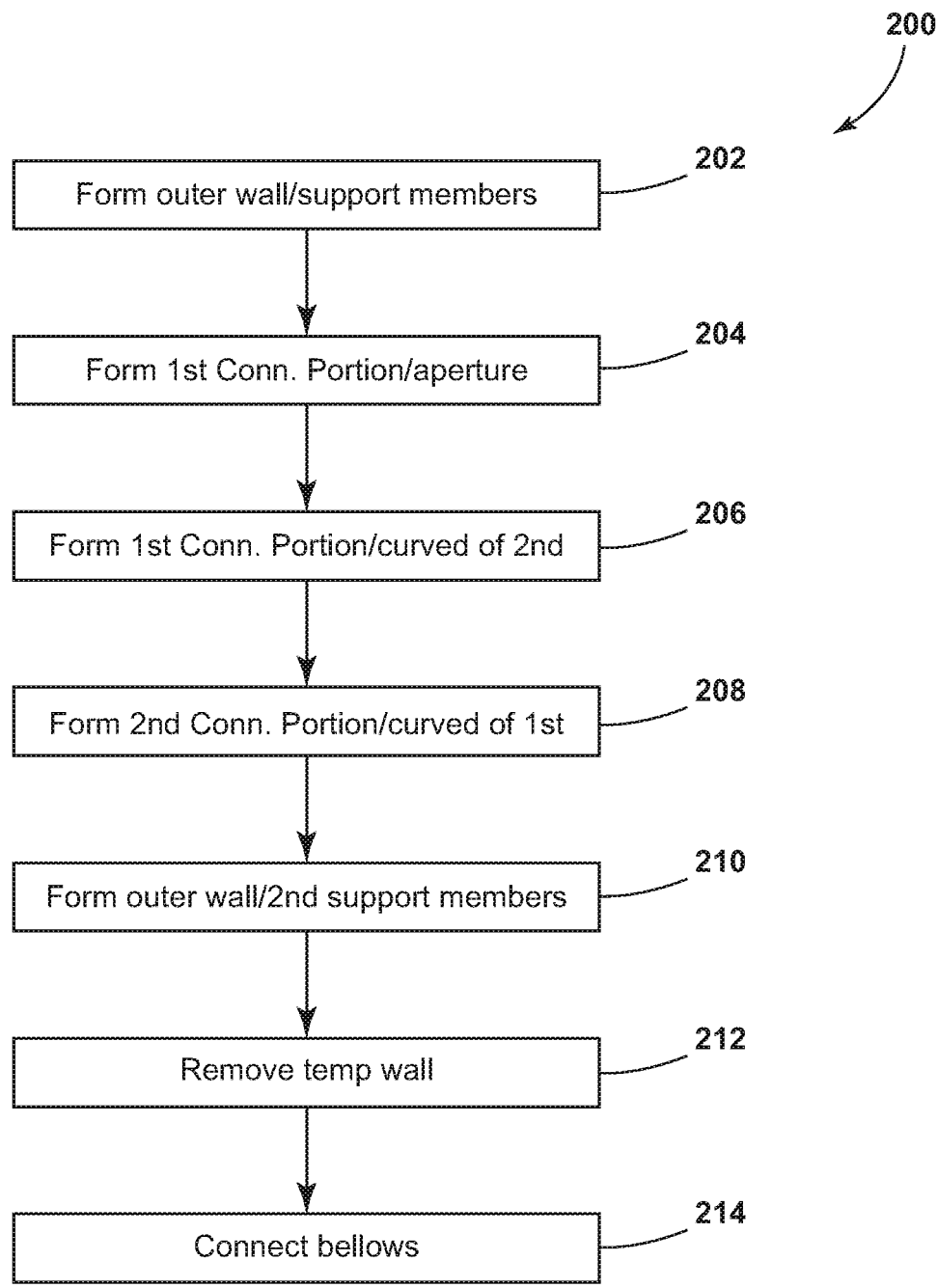
FIG. 8 is a flow diagram generally conveying an embodiment of a method of forming a gimbal joint according to teachings of the present disclosure.

With embodiments, such as generally illustrated in FIG. 8, a method 200 of making or forming a gimbal joint 10 may include forming one or more portions of gimbal joint 10 via a plurality of layers 170, such as, for example, via additive manufacturing, which may include three dimensional (3D) printing. In embodiments, method 200 may include forming an outer wall 34 of a first member 20 and/or one or more structural portions 30 that may be connected to outer wall 34 (step 202). Forming one or more structural portions 30 may include forming at least some of a first connection portion 22 (e.g., portions of first connection portion 22, such as legs 60, 62, may be integrally formed with one or more structural portions 30). Method 200 may include forming first connection portion 22 and/or an aperture 24 of first connection portion (step 204).

Method 200 may include forming at least a portion (e.g., a curved section 74) of a second connection portion 42 of a second member 40, such as before formation of first connection portion 22 is complete (step 206). For example and without limitation, portions of curved section 74 may be formed in aperture 24 as first connection portion 22 and/or aperture 24 are formed. Second connection portion 42 and/or curved section 74 of second member 40 may be the first portion of second member 40 to be formed. At least initially, second connection portion 42 may be in contact with one or more of structural portions 30 of first member 20 and/or may be temporarily fixed to a support base 32 of first member 20. For example and without limitation, an outer surface 78 of curved section 74 may be temporarily connected or fixed to support base 32 at a designated breakaway portion or area 220. Once formation is complete, curved section 74 may be broken away from support base 32 at or about designated breakaway portion or area 220.

In embodiments, a method 200 may include continuing to form first connection portion 22 and second connection portion 42 (step 208). For example and without limitation, a curved section 64 of first connection portion 22 may be formed at least partially between a first leg 70 of second connection portion 42, a second leg 72 of second connection portion 42, and a curved section 74 of second connection portion 42 (e.g., in an aperture 44 of second member 40) as first leg 70 and second leg 72 are being formed (e.g., curved section 64 of first member 20 may be formed, at least in part, in aperture 44 of second member 40 as aperture 44 is being formed).

In embodiments, a method 200 may include forming an outer wall 54 of second member 40 and/or forming one or more structural portions 50 and/or a support base 52 of second member 40 (step 210). One or more layers (e.g., layer 170₃) may be formed that may include portions of outer wall 54, structural portions 50, and/or support base 52. One or more layers 170 (e.g., layer 170₁) may include structural portions 50 and/or support base 52 and may not include outer wall 54 (e.g., layers for portions of second member 40 that extend axially beyond outer wall 54).

With embodiments, some or all of a gimbal joint 10 may be formed as a single, unitary, and/or monolithic component (which may be referenced herein simply as "monolithic"). For example and without limitation, first member 20, which may include structural portions 30, a support base 32, an outer wall 34, and/or a first connection portion 22, may be formed as a monolithic component. Additionally or alternatively, second member 40, which may include structural portions 50, a support base 52, an outer wall 54, and/or a second connection portion 42, may be formed as a monolithic component. In embodiments, first member 20 and second member 40 may be formed as monolithic components movably connected (e.g., permanently) via first connection portion 22 and second connection portion 42.

With embodiments, first connection portion 22 and second connection portion 42 may, at least initially, be connected or fixed to each other. For example and without limitation, an inner surface 66 of curved section 64 of first connection portion 22 may be temporarily fixed to an inner surface 76 of curved section 74 of second connection portion 42 at a designated breakaway portion or area 222 (e.g., at or about contact area or point 90). Additionally or alternatively, an outer surface 68 of curved section 64 of first connection portion 22 may be temporarily connected or fixed to a support base 52 of second member 40 at a designated breakaway portion or area 224. Once formation is complete, first member 20 and second member 40 may be broken away from each other at or about the designated breakaway portion(s) or area(s) 220, 222, 224.

With embodiments, a method 300 of making or forming a gimbal joint 100 may include one or more steps similar to those of method 200 of forming gimbal joint 10. Method 300 of making or forming gimbal joint 100 may include forming an outer wall 132 of a first member 120 and/or forming one or more structural portions 130 of first member 120 (step 302). Method 300 may include continuing to form structural portions 130 and/or forming of a first connection portion 122 and a socket 124 of first member 120 (step 304). Structural portions 130 may be formed to extend from an inner surface 134 of outer wall 132 to first connection portion 122 (e.g., radially inward and axially toward second member 140).

Method 300 may include continuing to form first connection portion 122 and/or forming a second connection portion 142 of a second member 140, which may include forming portions of first connection portion 122 and second connection portion 142 simultaneously and/or in the same layer, such as layer 170₄ (step 306). For example and without limitation, a ball 144 of second connection portion 142 may be formed at least partially in socket 124 and/or chamber 126, such as while socket 124 is being formed. Forming a ball 144 at least partially in socket 124 may include connecting ball 144 with socket 124 at a designated breakaway portion or area 320. For example and without limitation, an outer surface 144A of ball 144 may initially be connected with socket 124 at a designated breakaway portion or area 320. A gimbal joint 100 may include one or more other breakaway points or areas.

In embodiments, method 300 may include continuing to form second connection portion 142, which may include forming a connecting portion 146, and/or forming one or more structural portions 150 of second member 140 (step 308). A connecting portion 146 may connect a ball 144 of second connection portion 142 with structural portions 150. Method 300 may include continuing to form connecting portion 146 and structural portions 150, and/or forming an outer wall 152 of second member 140 (step 310).

With embodiments, some or all of a gimbal joint 100 may be formed as a single, unitary, and/or monolithic component. For example and without limitation, first member 120, which may include an outer wall 132, structural portions 130, a first connection portion 122, and/or socket 124, may be formed as a monolithic component. Additionally or alternatively, second member 140, which may include an outer wall 152, structural portions 150, a second connection portion 142, and/or ball 144, may be formed as a monolithic component. In embodiments, first member 120 and second member 140 may each be formed as monolithic components connected (e.g., permanently) via socket 124 and ball 144.

Figure 4:
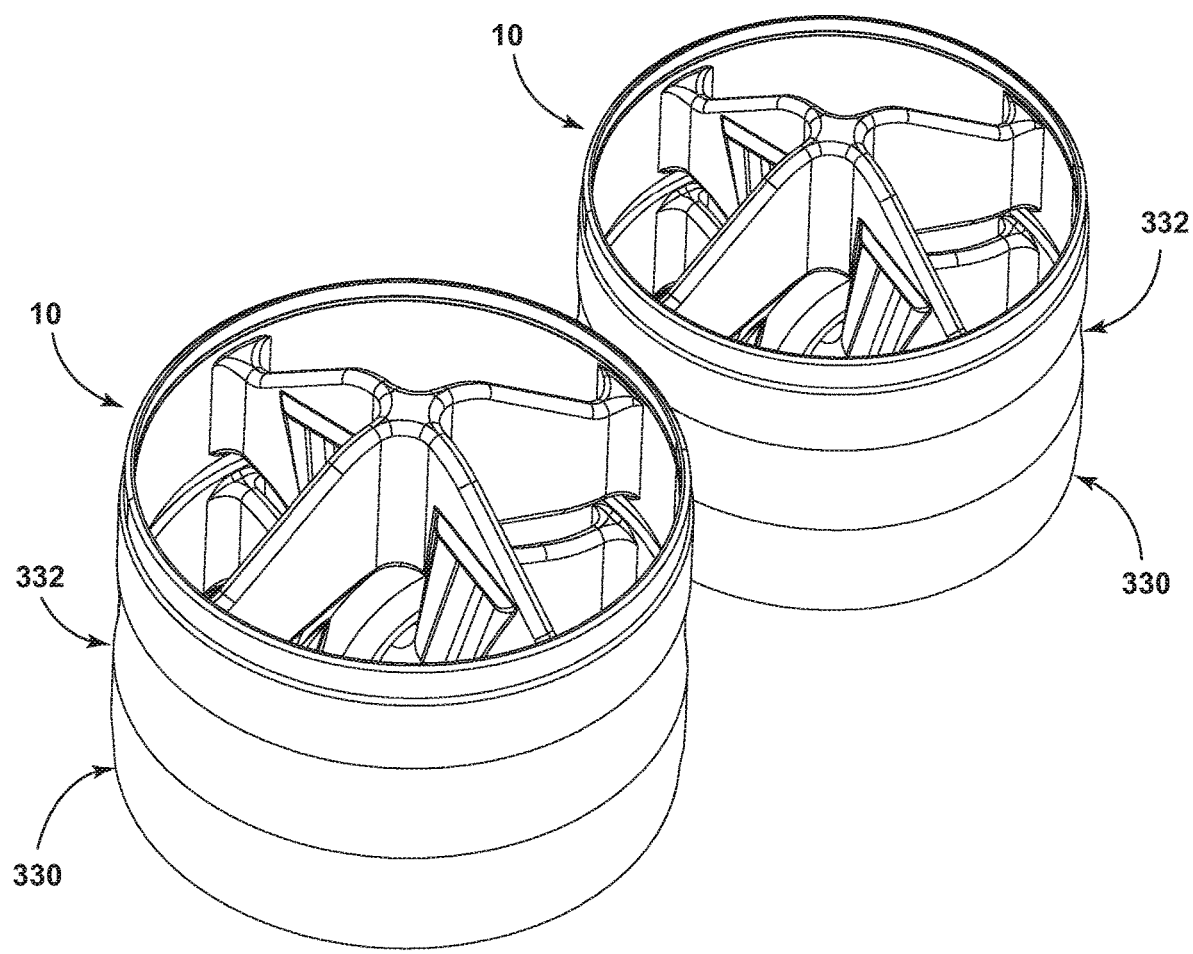
FIG. 4 is a perspective view generally illustrating embodiments of gimbal joints according to teachings of the present disclosure.
Figure 5:
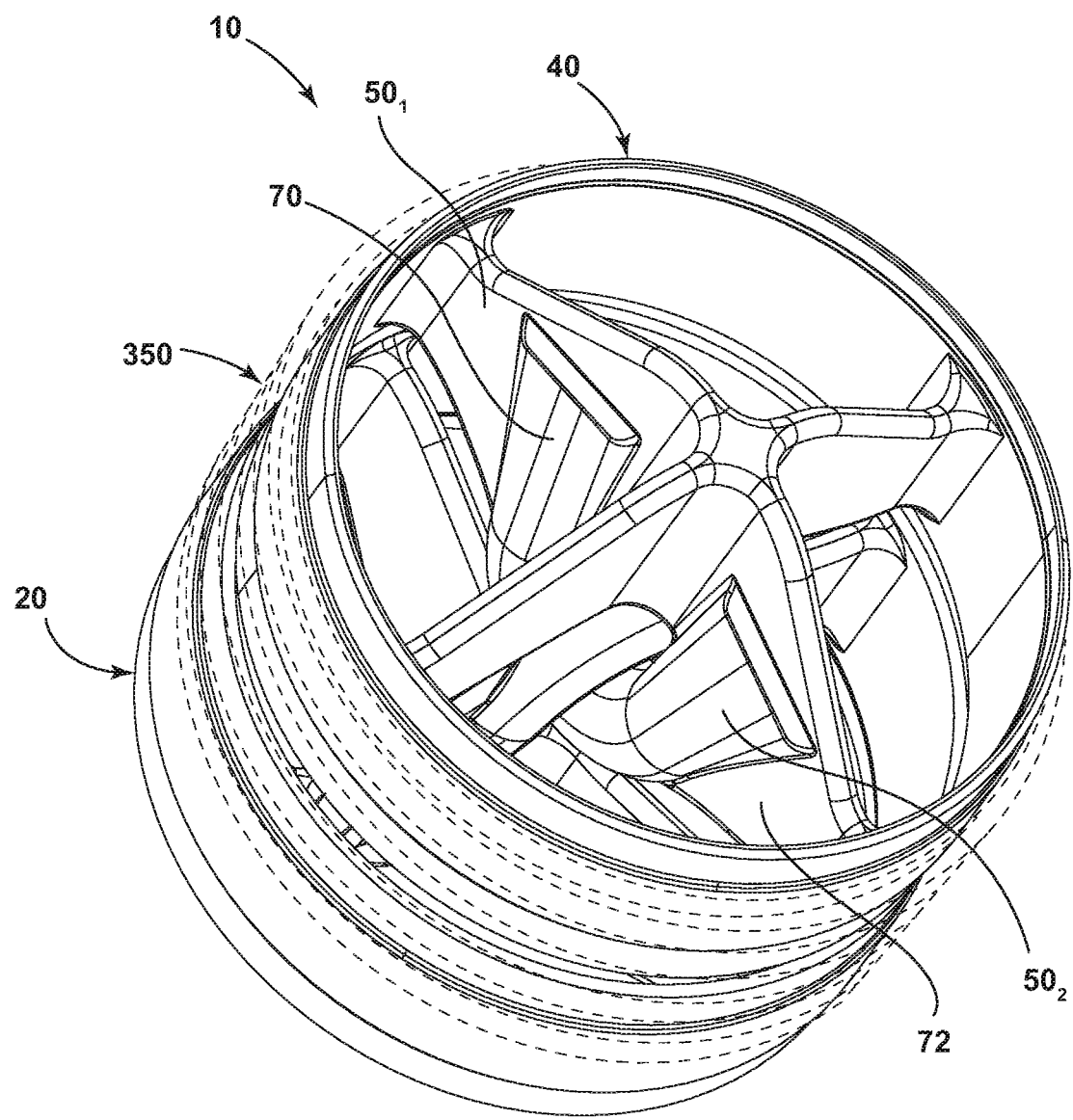
FIG. 5 is a perspective view generally illustrating an embodiment of a gimbal joint according to teachings of the present disclosure.

With embodiments, such as generally illustrated in FIGS. 2, 4, and FIG. 8, a method 200 of forming a gimbal joint 10 may include forming one or more temporary wall sections or portions. For example and without limitation, a first temporary wall section 330 may be formed at or about a first end 26 of first member 20 of a gimbal joint 10 and may be formed along with structural portions 30 and/or a support base 32. A first temporary wall section 330 may extend (e.g., axially) from the first end 26 to the outer wall 34. A second temporary wall section 332 of a gimbal joint 10 may be formed between and/or connected to outer wall 34 of first member 20 and outer wall 34 of second member 40. A second temporary wall section 332 may restrict relative movement between the outer wall 34 of first member 20 and the outer wall 54 of the second member 40 (e.g., may provide structural support during formation). In embodiments, method 200 may include removing the first temporary wall section 330 and/or the second temporary wall section 332 once formation of some or all other portions of gimbal joint 10 is complete (step 212). Temporary wall sections 330, 332 may be removed, for example only, via machining and/or one or more material removal methods. Removing temporary wall section 332 may, for example, provide an axial gap 332A between outer wall 34 and outer wall 54.

Figure 9:
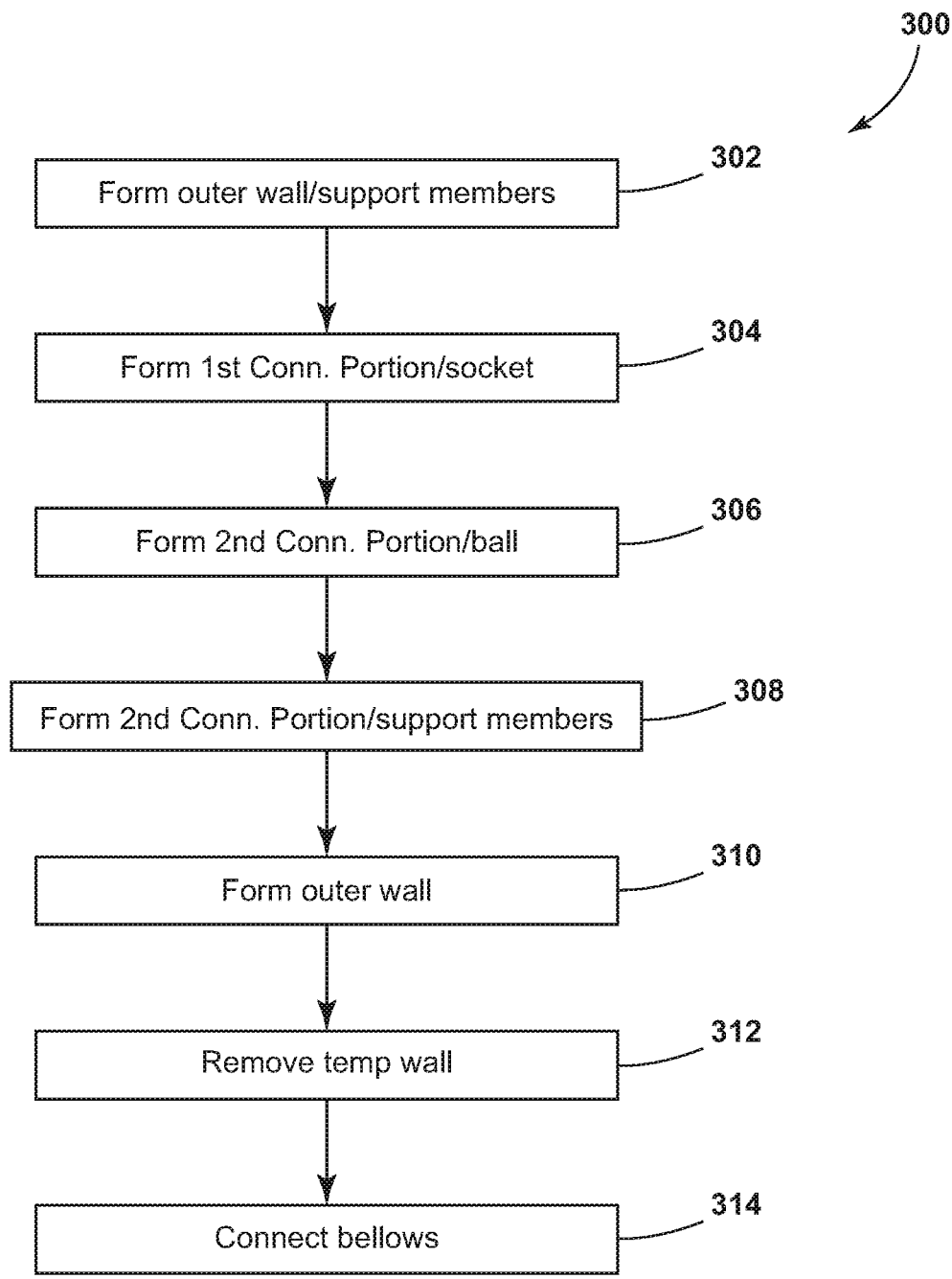
FIG. 9 is a flow diagram generally conveying an embodiment of a method of forming a gimbal joint according to teachings of the present disclosure.

In embodiments, such as generally illustrated in FIGS. 6, 7, and 9, a method 300 of forming a gimbal joint 100 may include forming one or more temporary wall sections. For example and without limitation, a temporary wall section 334 of gimbal joint 100 may be formed between and/or connected to outer wall 132 of first member 120 and outer wall 152 of second member 140 (e.g., one or more of steps 304, 306, 308 may include forming portions of temporary wall section 334). Temporary wall section 334 may restrict relative movement between outer wall 132 of first member 120 and outer wall 152 of second member 140 (e.g., may provide structural support during formation). Temporary wall section 334 may be formed adjacent to outer wall 132 of first member 120 and/or outer wall 152 of second member 140 may be formed adjacent to temporary wall section 334. With embodiments, method 300 may include removing temporary wall section 334 (step 312).

In embodiments, portions of a second member 40, 140 may be formed simultaneously with portions of first member 20, 120. For example and without limitation, a gimbal joint 10. 100 may be formed via a plurality of layers 170 and/or may include one or more layers that may include portions of a first member 20, 120 and portions of a second member 40, 140 (e.g., layers 1702, 1703, such as generally illustrated in FIG. 2A). If a layer 170 includes portions of first member 20, 120 and portions of second member 40, 140, portions of first member 20, 120 and portions of the second member 40, 140 may or may not be connected/in contact with each other in that particular layer.

In embodiments, formation of a gimbal joint 10, 100 may be conducted in phases. For example and without limitation, formation may include a first phase, a second phase, a third phase, and/or a fourth phase. In a first phase, portions of a first member 20, 120 may be formed and portions of a second member 40, 140 may not be formed. In a second phase, portions of a first member 20, 120 and a second member 40, 140 may be formed simultaneously (e.g., formed layers 170 may include portions of a first member 20, 120 and of a second member 40, 140). Some or all of first connection portions 22, 122 and second connection portions 42, 142 may be formed during the second phase. A temporary wall section 332, 334 may be formed, at least in part, during the second phase. In a third phase, portions of a second member 40, 140 may be formed and portions of a first member may not be formed (e.g., formation of first member 20, 120 may be complete and/or one or more formed layers (e.g., layer 1701, such as generally illustrated in FIG. 2A) may include only portions of second member 40, 140). In a fourth phase, one or more temporary wall sections 330, 332, 334 may be removed and/or disconnected, such as via machining. Removing temporary wall sections 330, 332, 334 may be the only material removal and/or machining involved in formation of a gimbal joint 10, 100.

With embodiments, a gimbal joint 10, 100 may be formed vertically. For example and without limitation, layers 170 of a first member 20, 120 of a gimbal joint 10, 100 may be formed first, such as on a forming surface. Formation may continue, in a vertical direction, with forming structural portions 30, 130 and/or an outer wall 34, 132. A first connection portion 22, 122 may be formed above outer wall 34, 132 and/or above structural portions 30, 130. A second connection portion 42, 142 may be formed at least partially in and/or above first connection portion 22, 122. Structural portions 50, 150 and an outer wall 54, 152 may be formed above second connection portion 42, 142. A temporary wall section 332, 334 may be formed above (e.g., on top of an edge of) outer wall 34, 132 of first member 20, 120 and/or outer wall 54, 152 of a second member 40, 140 may be formed above (e.g., on a top edge of) temporary wall section 332, 334. Portions of structural portion 50, 150 may be formed above a top of an outer wall 54, 152.

Referring again to FIG. 5, in embodiments, a bellows 350 may be connected to a gimbal joint 10, 100. For example and without limitation, a bellows 350 may be welded to a first member 20, 120 and/or a second member 40, 140. A method 200 of forming a gimbal joint 10 may include connecting a bellows 350 to first member 20 and/or second member 40 (step 214). A method 300 of forming a gimbal joint 100 may include connecting a bellows 350 to first member 120 and/or second member 140 (step 314).

Figure 10:
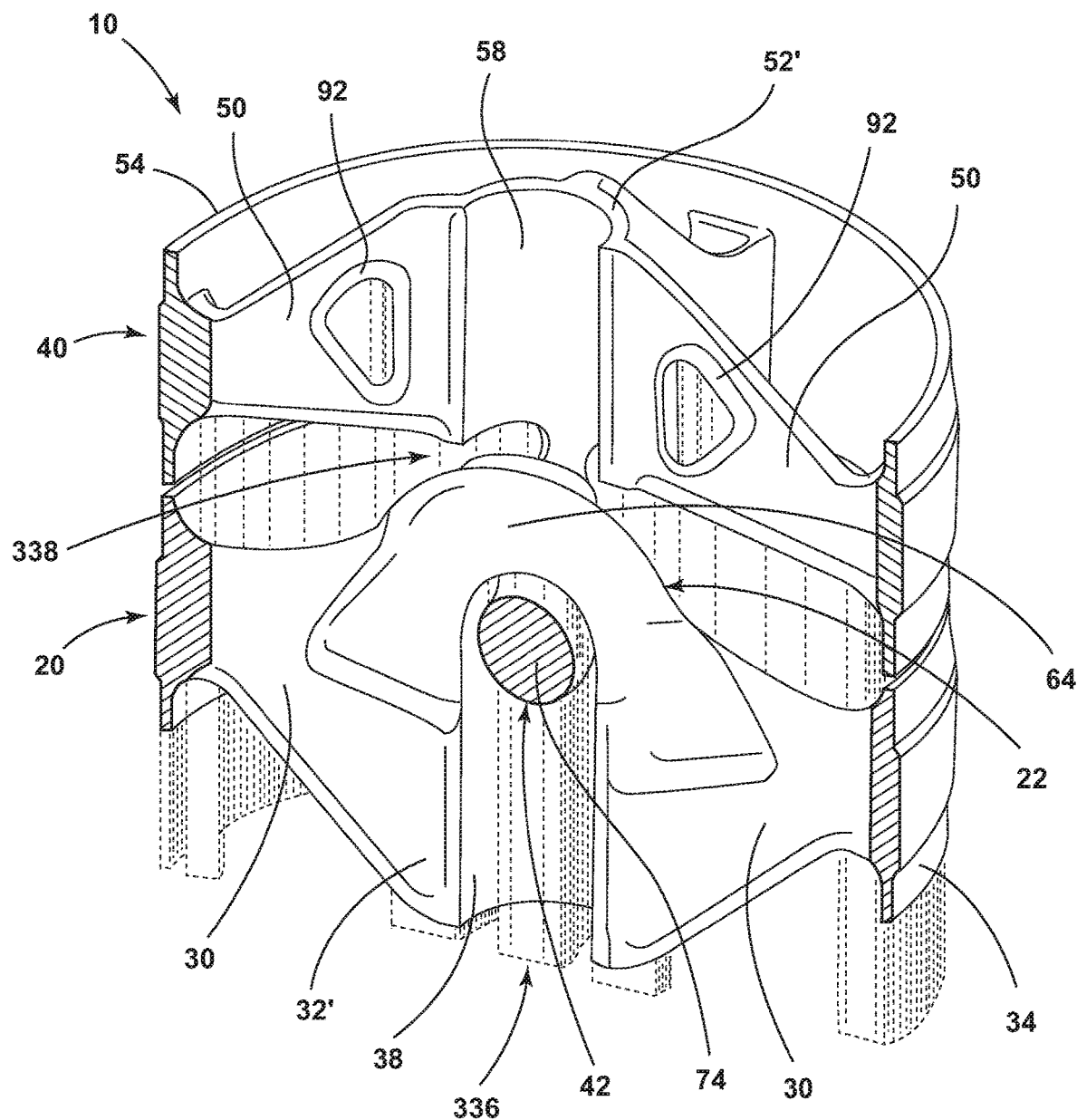
FIG. 10 is a cross-sectional perspective view generally illustrating an embodiment of a gimbal joint with support bases having apertures according to teachings of the present disclosure.
Figure 11A:
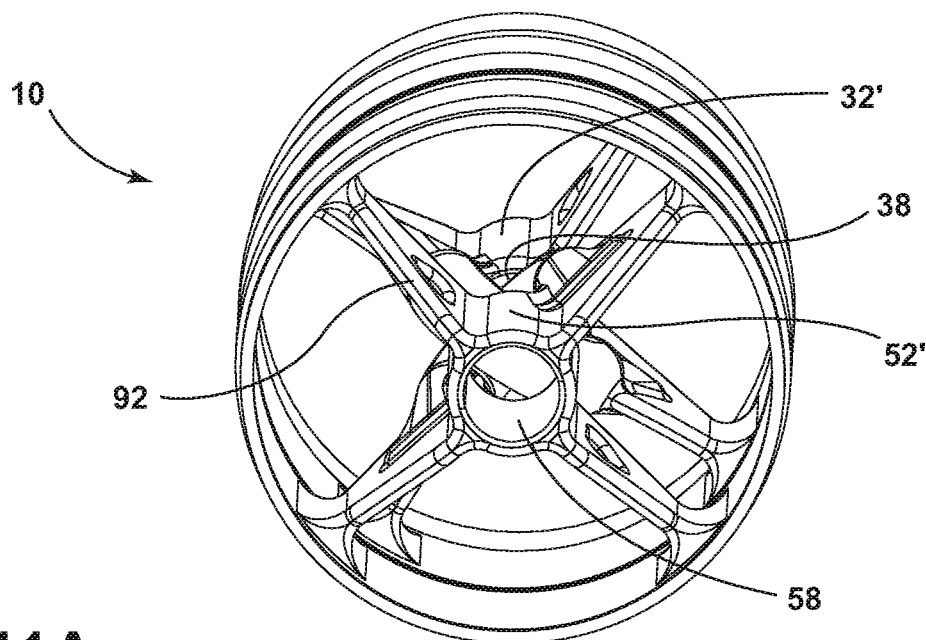
FIGS. 11A, 11B, 11C, and 11D are perspective views generally illustrating embodiments of gimbal joints with support bases having apertures according to teachings of the present disclosure.
Figure 11B:
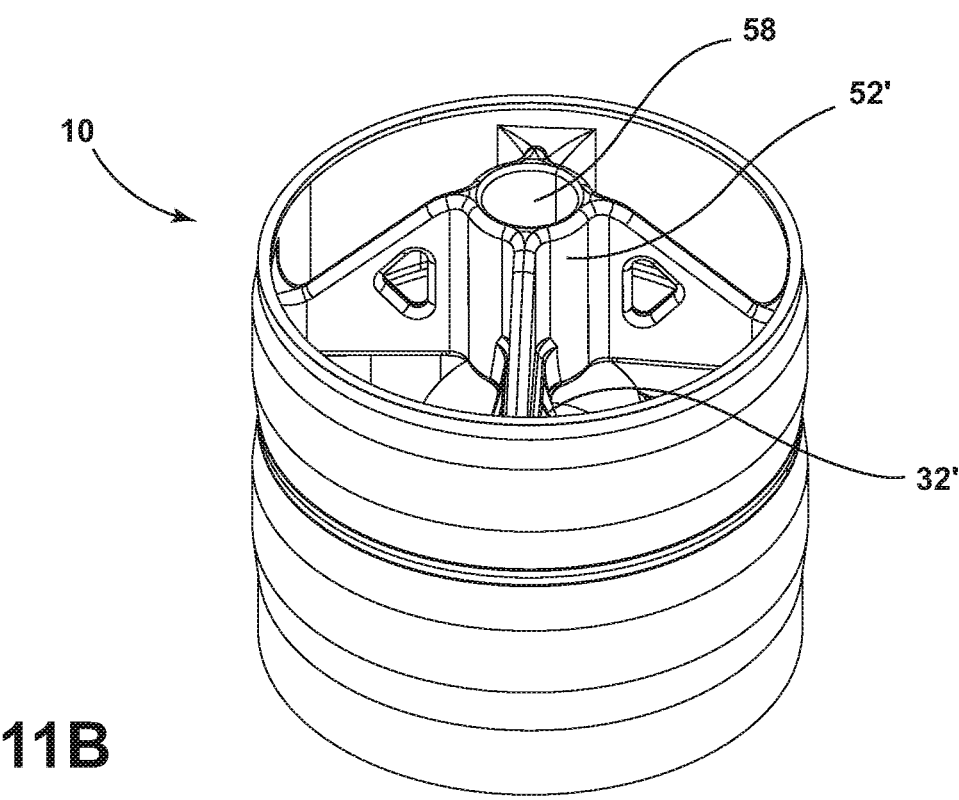
Figure 11C:
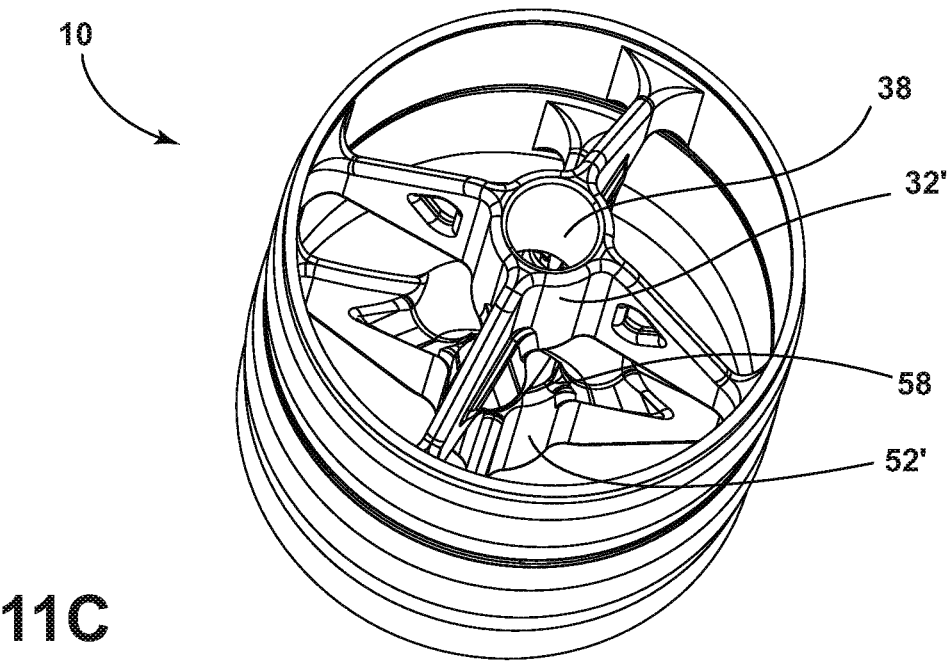
Figure 11D:
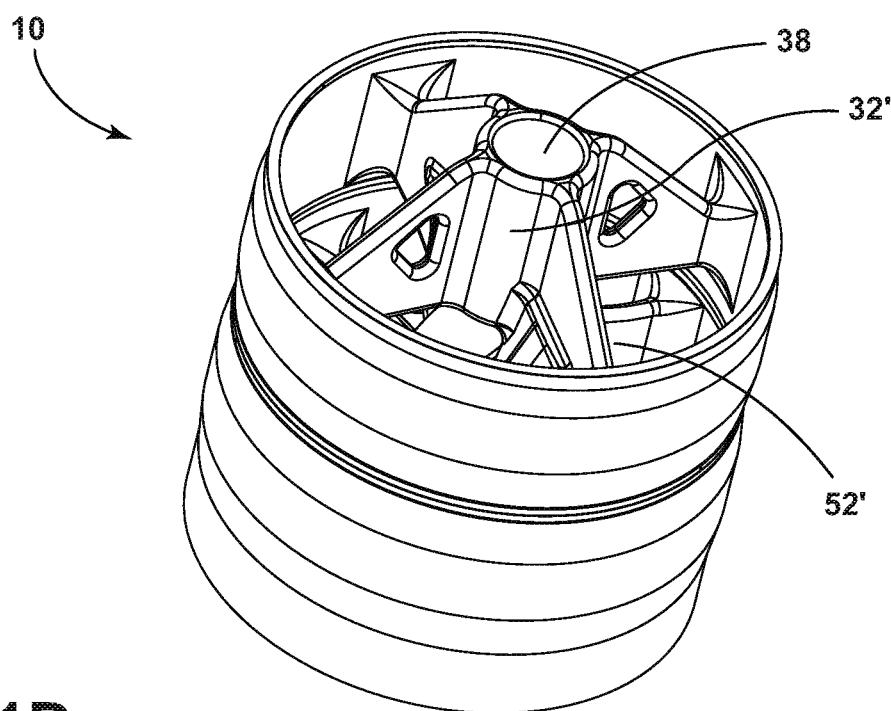

With embodiments, such as generally illustrated in FIG. 10, a structural portion 30, 50 may include one or more weight reduction formations 92, such as recesses, cavities, and/or apertures. The weight reduction formations 92 may be formed (e.g., via additive manufacturing) in the structural portions 30, 50, which may reduce a weight of a joint 10. A weight reduction formation 92 may, for example and without limitation, include a triangular configuration.

In embodiments, such as generally illustrated in FIGS. 10, 11A, 11B, 11C, and 11D, a first member 20 of a joint 10 may include a support base 32' and/or a second member 40 may include a support base 52'. A support base 32', 52' may include an aperture 38, 58 that may provide a support base 32', 52' with a generally a cylindrical or tubular configuration. An aperture 38, 58 may extend in a generally axial direction and may extend from a first axial end to a second axial end of a support base 32', 52'. Diameters of the apertures 38, 58 may be at least as great as the diameters of the corresponding curved sections 74, 64.

In embodiments, structural portions 30, 50 may extend radially from a support base 32', 52' to inner surfaces 36, 56 of outer walls 34, 54 of the first member 20 and the second member 40, respectively.

Figure 12A:
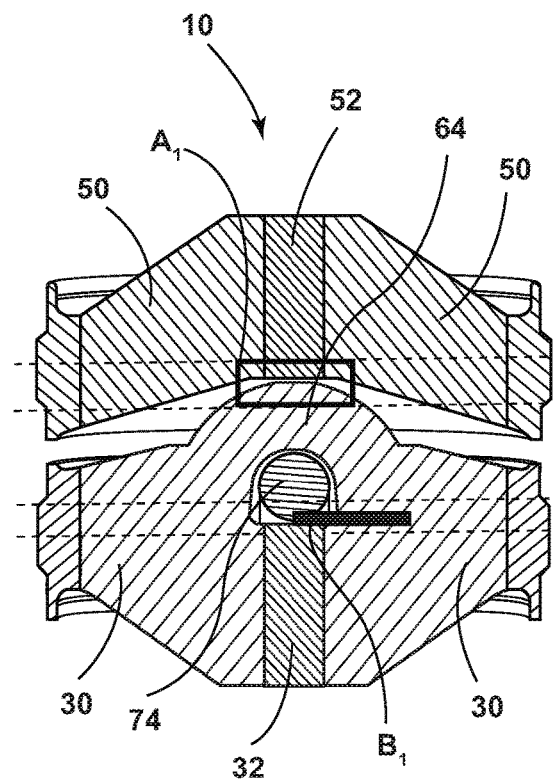
FIG. 12A is a cross-sectional view generally illustrating an embodiment of a gimbal joint according to teachings of the present disclosure.
Figure 12B:
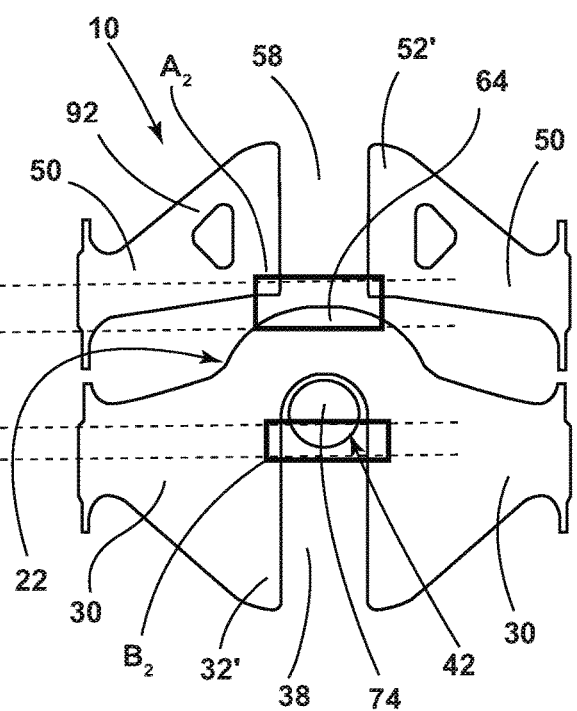
FIG. 12B is a cross-sectional view generally illustrating an embodiment of a gimbal joint with a support base having an aperture according to teachings of the present disclosure.

With embodiments, such as generally illustrated in FIGS. 12A and 12B, a support base 32', 52' having an aperture 38, 58 may, at least after manufacturing is complete, provide greater separation or clearance between the support base 32', 52' and a corresponding connection portion 42, 22 of the second member 40 and the first member 20, respectively, compared to support bases without apertures (see, e.g., areas $A_1, A_2, B_1, B_2$). Additionally or alternatively, an aperture 38, 58 may provide access to the curved sections 64, 74 of the connection portions 22, 42, which may facilitate removal of temporary walls/formations that may be formed during manufacturing to temporarily support or connect certain portions of a joint 10. For example and without limitation, and as generally illustrated in FIG. 10, a temporary formation 336 may be formed, such as in the aperture 38 of the support base 32', to temporarily support the curved section 74 of the second connection member 42 (e.g., the curved section 74 may be formed on top of the temporary formation 336). A temporary formation 336 may, for example and without limitation, include a plurality of vertical columns that may have generally rectangular configurations. Providing the support base 32' with the aperture 38 may, for example, facilitate removal of the temporary formation 336, the disconnection of the temporary formation 336 from the curved section 74, and/or surface treatment of the bottom of the curved section 74.

In embodiments, during manufacturing of a joint 10, one or more temporary formations 338 may be provided (e.g., formed) to support portions of the second member 40. For example and without limitation, temporary formations 338 may be formed, at least in part, on the curved section 64 of the first connecting portion 22. The temporary formations 338 may, for example, support portions of the structural portions 50 and/or the support base 52'. Providing the support base 52' with an aperture 58 may facilitate access to and/or removal/disconnection of the temporary formations 338 from one or more of the curved section 64, the structural portions 50, and the support base 52'. In the absence of an aperture 38, 58, temporary formations (e.g., temporary formations 336, 338) may not be sufficiently accessible and may be accessed less directly, such as from a generally radial direction (e.g., through a gap between the outer walls 34, 54), and/or around/between the structural portions 30, 50.

With a support base 32 that does not include an aperture 38, a corresponding curved section 74 may be connected to a greater amount of temporary formations and/or to a larger portion of the support base 32, compared to a support base 32' with an aperture 38. Additionally or alternatively, with a support base 52 that does not include an aperture 58, a corresponding curved section 64 may be connected to a greater amount of temporary formations and/or to a larger portion of the support base 52, compared to a support base 52' with an aperture. For example and without limitation, the curved section 64 may be utilized to at least temporarily support a circular axial surface of the support base 52, compared to only a ring-shaped axial surface of the support base 52', which may involve fewer connections and/or temporary formations. Reducing the amount of connections and/or providing more access to the connections may decrease the complexity of manufacturing.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A gimbal joint, comprising:
   a monolithic first member including a first connection portion, wherein the monolithic first member is configured for connection with a first high temperature fluid duct; and
   a monolithic second member including a second connection portion engaged with the first connection portion, wherein the monolithic second member is configured for connection with a second high temperature fluid duct;
   wherein the monolithic first member and the monolithic second member are configured to move relative to each other about a plurality of axes; and
   wherein the first connection portion and the second connection portion each includes a curved section, wherein each of the curved section of the first connection portion and the curved section of the second connection portion are substantially u-shaped and form a first loop and a second loop that interlock with one another.

2. The gimbal joint of claim 1, wherein at least one of the monolithic first member and the monolithic second member are formed via additive manufacturing.

3. A gimbal joint comprising:
   a monolithic first member including a first connection portion, wherein the monolithic first member is configured for connection with a first high temperature fluid duct; and
   a monolithic second member including a second connection portion engaged with the first connection portion, wherein the monolithic second member is configured for connection with a second high temperature fluid duct;
   wherein the monolithic first member and the monolithic second member are configured to move relative to each other about a plurality of axes; wherein the first connection portion and the second connection portion each includes a curved section directly engaged with one another; and wherein the curved section of the first connection portion includes a first loop, and the curved section of the second connection portion includes a second loop engaged with the first loop.

4. A gimbal joint comprising:
a monolithic first member including a first connection portion, wherein the monolithic first member is configured for connection with a first high temperature fluid duct; and
a monolithic second member including a second connection portion engaged with the first connection portion, wherein the monolithic second member is configured for connection with a second high temperature fluid duct;
wherein the monolithic first member and the monolithic second member are configured to move relative to each other about a plurality of axes; wherein the first connection portion and the second connection portion each includes a curved section directly engaged with one another; and wherein the monolithic first member is substantially identical to the monolithic second member.

5. A gimbal joint comprising:
a monolithic first member including a first connection portion, wherein the monolithic first member is configured for connection with a first high temperature fluid duct; and
a monolithic second member including a second connection portion engaged with the first connection portion, wherein the monolithic second member is configured for connection with a second high temperature fluid duct;
wherein the monolithic first member and the monolithic second member are configured to move relative to each other about a plurality of axes; wherein the first connection portion and the second connection portion each includes a curved section directly engaged with one another; and wherein the monolithic first member includes a plurality of support members and a support base; and the support base includes an axially-extending aperture that extends through the support base; wherein the axially-extending aperture provides clearance between the support base of the monolithic first member and a loop portion of the monolithic second member.

6. A gimbal joint, comprising:
a monolithic first member including a first connection portion, wherein the monolithic first member is configured for connection with a first high temperature fluid duct; and
a monolithic second member including a second connection portion engaged with the first connection portion, wherein the monolithic second member is configured for connection with a second high temperature fluid duct;
wherein the monolithic first member and the monolithic second member are configured to move relative to each other about a plurality of axes; and
wherein the first connection portion and the second connection portion each includes a curved section, wherein each of the curved section of the first connection portion and the curved section of the second connection portion are substantially u-shaped and directly engaged with one another, wherein the monolithic first member includes a plurality of support members and a support base; and the support base includes an axially-extending aperture that extends through the support base.

7. The gimbal joint of claim 6, wherein the monolithic second member includes a plurality of support members and a support base; and the support base of the monolithic second member includes an axially-extending aperture that extends through the support base of the monolithic second member.

8. A gimbal joint, comprising:
a monolithic first member including a first connection portion, wherein the monolithic first member is configured for connection with a first high temperature fluid duct; and
a monolithic second member including a second connection portion engaged with the first connection portion, wherein the monolithic second member is configured for connection with a second high temperature fluid duct;
wherein the monolithic first member and the monolithic second member are configured to move relative to each other about a plurality of axes;
wherein the monolithic first member includes a cylindrical first outer wall and also includes a plurality of first structural portions that extend radially from the first connection portion to an inner surface of the first outer wall, wherein the plurality of first structural portions are circumferentially spaced about the first outer wall, and wherein the plurality of first structural portions are integrally formed with the first connection portion; and
wherein the monolithic second member includes a cylindrical second outer wall and also includes a plurality of second structural portions that extend radially from the second connection portion to an inner surface of the second outer wall, wherein the plurality of second structural portions are circumferentially spaced about the second outer wall, and wherein the plurality of second structural portions are integrally formed with the second connection portion.

9. The gimbal joint of claim 8,
wherein the monolithic first member comprises a first loop,
wherein a first portion of the first loop extends from a first structural portion of the plurality of first structural portions, and a second portion of the first loop extends from a second structural portion of the plurality of first structural portions,
wherein the monolithic second member comprises a second loop,
wherein a first portion of the second loop extends from a first structural portion of the plurality of second structural portions, and a second portion of the second loop extends from a second structural portion of the plurality of second structural portions, and
wherein the first loop and the second loop are interlocked with one another.

10. The gimbal joint of claim 8, wherein the monolithic first member is substantially identical to the monolithic second member.

11. The gimbal joint of claim 8, wherein the monolithic first member includes a support base; and the support base includes an axially-extending aperture that extends through the support base.

12. The gimbal joint of claim 8, wherein the first connection portion includes a substantially spherical configuration, and the second connection portion includes a socket, and the first connection portion is disposed at least partially in the socket.

13. The gimbal joint of claim 8, further comprising a bellows connected to the monolithic first member and the monolithic second member.

* * * * *